C. T. BARTON.
Cultivator.

No. 208,284.          Patented Sept. 24, 1878.

WITNESSES:
Francis McArdle.
C. Sedgwick.

INVENTOR:
C. T. Barton
BY Munn & Co
ATTORNEYS.

UNITED STATES PATENT OFFICE.

CLARK T. BARTON, OF TUSCUMBIA, ALABAMA.

IMPROVEMENT IN CULTIVATORS.

Specification forming part of Letters Patent No. 208,284, dated September 24, 1878; application filed March 19, 1878.

*To all whom it may concern:*

Figure 1:
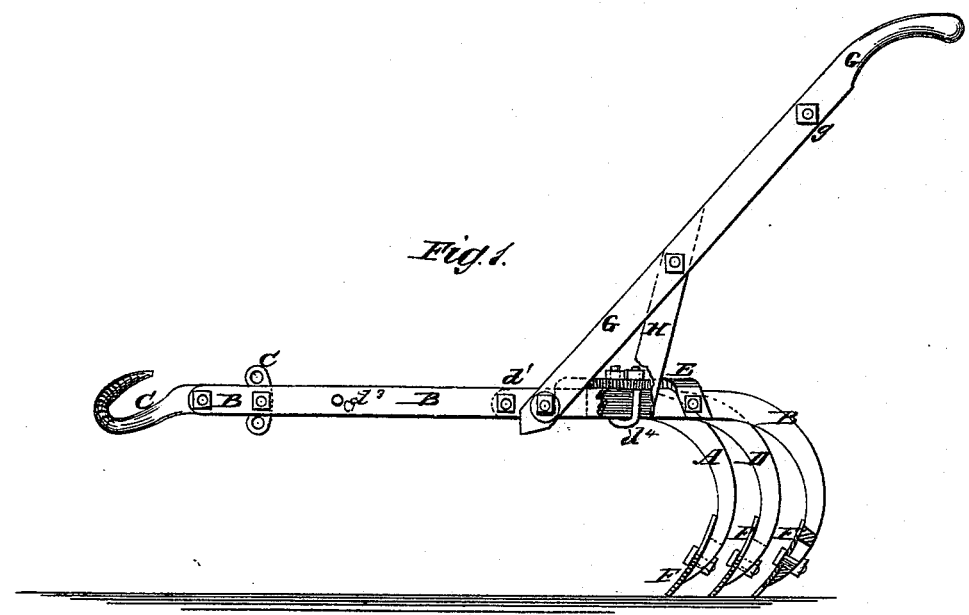
Figure 2:
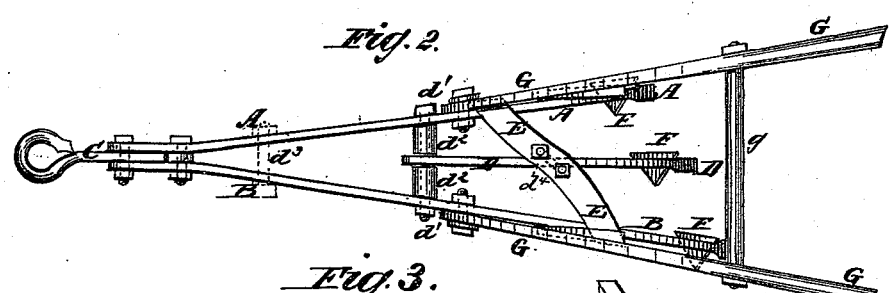
Figure 3:
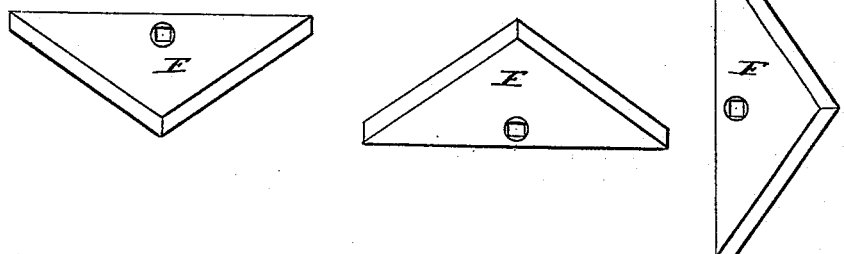

Be it known that I, CLARK T. BARTON, of Tuscumbia, in the county of Colbert and State of Alabama, have invented a new and useful Improvement in Cultivators, of which the following is a specification:

Figure 1 is a side view of my improved cultivator. Fig. 2 is a top view of the same. Fig. 3 shows the plow-plate in different positions.

Similar letters of reference indicate corresponding parts.

The object of this invention is to furnish an improved cultivator which shall be simple in construction, light, and strong, and may be readily adjusted as a three-plow or two-plow cultivator, and as a two-horse cultivator, and which shall be so constructed that the plow-plates may be adjusted as a shovel, a half-shovel, a scraper, and a sweep, as may be required.

The invention will first be described in connection with the drawing, and then pointed out in the claim.

A B are the side beams, the forward ends of which are parallel with each other, and are secured together by two bolts.

C is the draft-hook, the shank of which is placed between the forward ends of the beams A B, and is secured by the two bolts that secure the said beams to each other. The rear end of the shank of the draft-hook C has a curved cross-head formed upon it, which has a number of holes formed through it to receive the rear bolt, so that by removing the said rear bolt the draft-hook may be adjusted to raise and lower the point of draft attachment, as may be required.

The side beams A B are made of different lengths, incline from each other as they pass to the rearward, and their rear ends are curved downward to bring them into proper position to receive the plow-plates.

D is the center beam, which is made short, and its forward end is secured by a bolt, $d^1$, which passes through the three beams. The forward end of the center beam is kept midway between the side beams by tubular washers $D^2$, placed upon the bolt and interposed between the said center beam and the said side beams. The rear end of the beam D is curved downward to bring it into proper position to receive the plow-plate. The beam D is made of such a length that its plow may be midway between the plows of the side beams and in line with them.

E is an inclined cross-bar, placed upon the three beams at the beginning of their downward curve, and the ends of which are bent downward and are bolted to the outer sides of the side beams A B. The center beam is secured to the center of the cross-bar E by a U-bolt, $d^4$, which has its upper ends passing through cross-bar E and secured by nuts on the upper side thereof. The rear ends of the beams A D B are slotted longitudinally to receive the square bolts that pass through square holes in the plow-plates, so that the said plows may be moved down as they wear, and so that they cannot turn when in use. The bolt-holes through the plow-plates are countersunk upon both sides of the said plates, so that the plates can be reversed when desired.

The plow-plates F are made triangular in form, and are slightly curved longitudinally to fit upon the lower ends of the beams A D B. When the plow-plates are arranged as shown in Figs. 1 and 2 they act as half-shovel plows, and may be reversed when one point becomes worn. This arrangement enables the plows to be adjusted to throw the soil from or toward the plants, as may by desired.

By turning the plow-plates one-quarter around, bringing the straight side upward, they become shovel-plows. By turning the plow-plates F one-quarter around, bringing their straight edges downward, they become scrapers. By turning the plow-plates F one-quarter around, bringing their straight edges downward and reversing them, bringing their convex sides forward, they become sweeps.

G are the handles, the forward ends of which are bolted to the side beams A B, and which are connected by a round, $g'$, and are supported at the desired elevation by the braces H. The upper ends of the braces H are bolted to the handles G, and their lower ends are bolted to the side beams A B.

When it is desired to have a two-horse cultivator, two of the cultivators are connected at the forward end of the side beams A B by a rod, which rod should be provided with hooks for the attachment of the draft. The two single cultivators may be connected at their rear ends or not, as may be desired. In this case the outer handles may be detached, and the machine guided by the inner handles.

To adjust the plow for forming a bed, the short beam D is detached and moved forward, and a bolt, $d^3$, is passed through its forward end and through holes formed in the side beams A B a little in the rear of the draft-hook C. The bolt $d^1$ is then passed through the holes in the side beams A B and through a hole formed in the rear part of the center beam D. The plow-plates F, with this adjustment, are arranged as half-shovel plows, and the plow-plates of the two side plates are arranged with their wings inward. As thus arranged the forward plow-plate will turn a furrow and the two rear plow-plates will throw their furrows upon it, forming a bed.

By removing the central beam D and adjusting the plow-plates of the side beams with their wings inward, the cultivator becomes an excellent seed-coverer.

Having thus described my invention, I claim as new and desire to secure by Letters Patent—

In a cultivator, the combination of short central beam D, long side beam B, short side beam A, bolt $d^1$, washers $d^2$, inclined cross-bar E, and U-bolt $d^4$, substantially as shown and described.

CLARK TALBOT BARTON.

Witnesses:
OWEN N. JULIAN,
D. E. MOODY.